June 5, 1945.   G. S. NALLE, JR   2,377,361
STRAIN GAUGE FABRICATING MACHINE
Filed Dec. 9, 1943   3 Sheets-Sheet 1
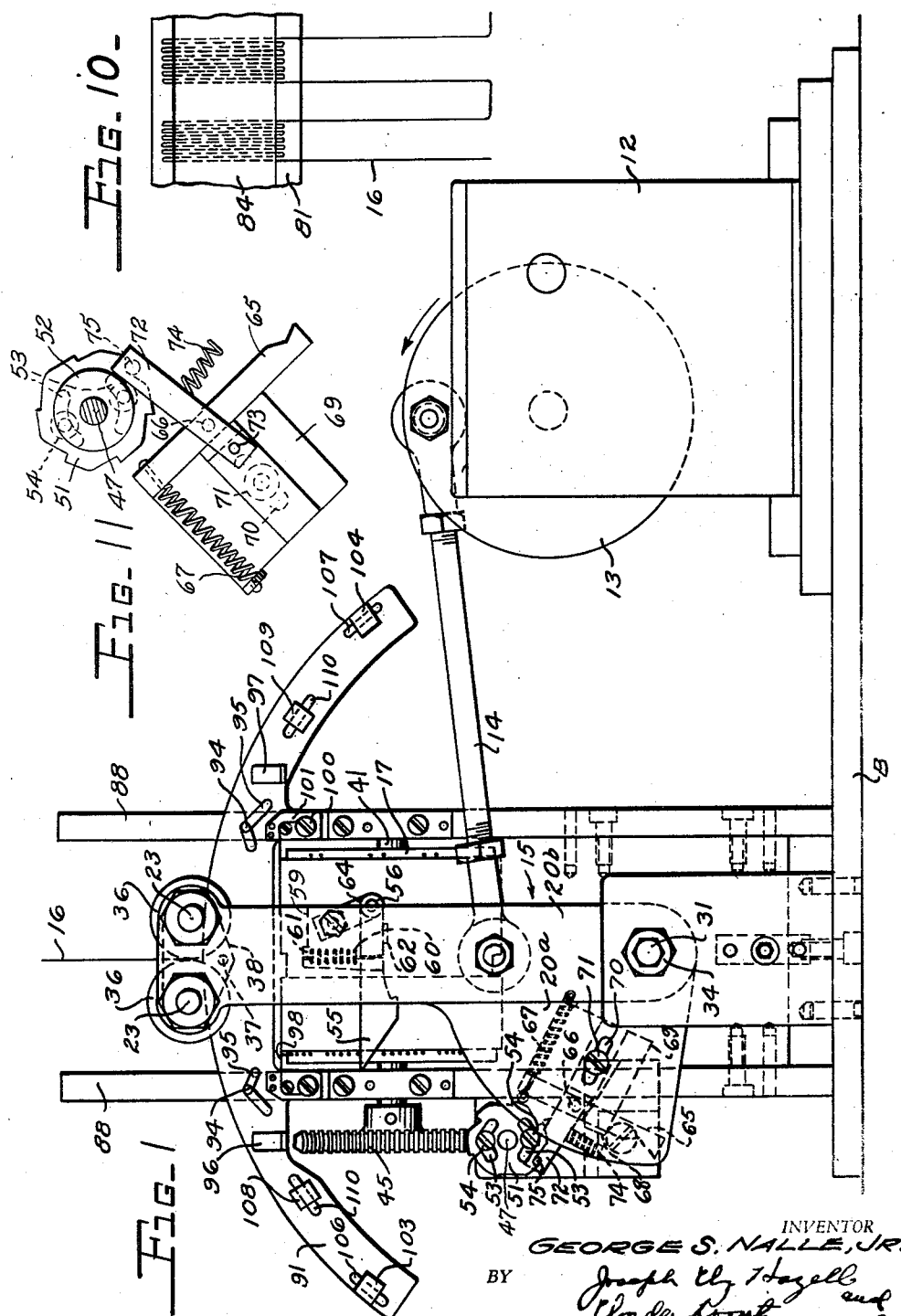
INVENTOR
GEORGE S. NALLE, JR.
BY
ATTORNEYS

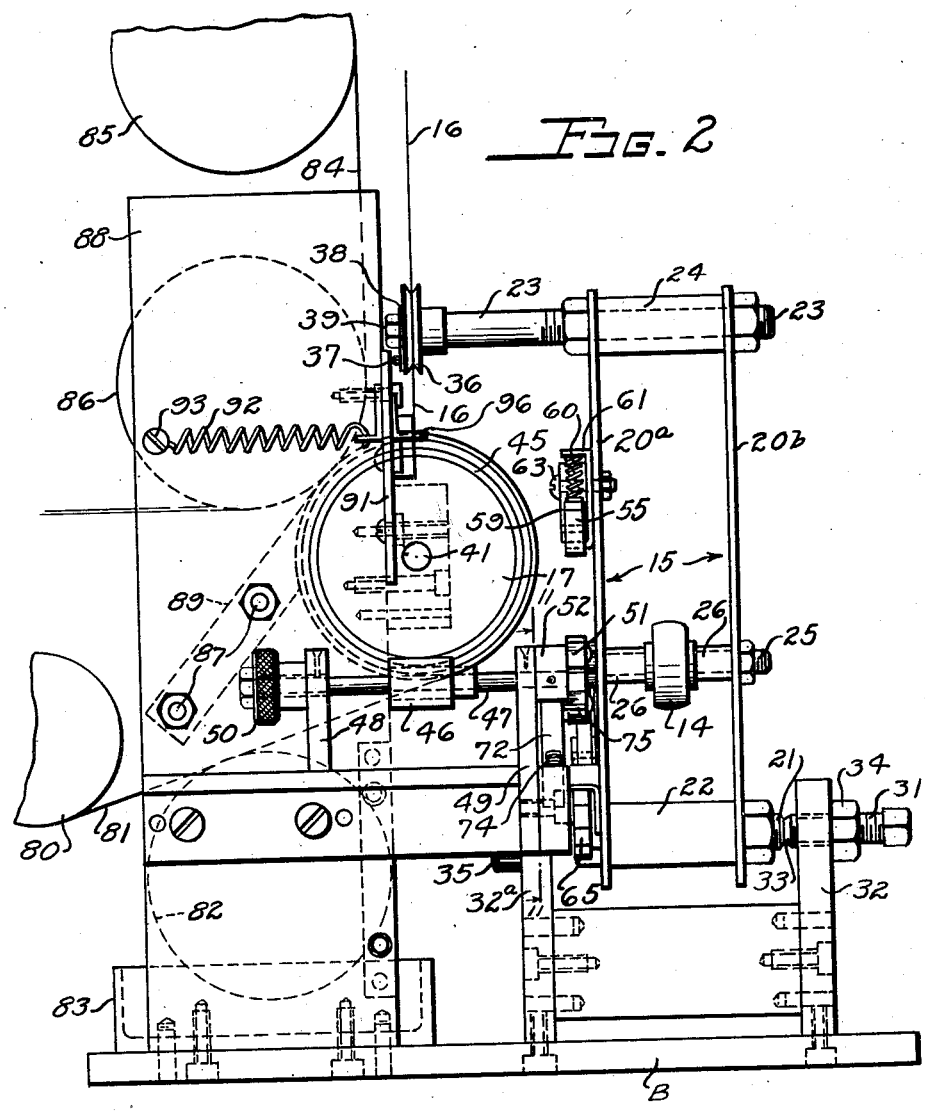

June 5, 1945. G. S. NALLE, JR 2,377,361
STRAIN GAUGE FABRICATING MACHINE
Filed Dec. 9, 1943 3 Sheets-Sheet 3
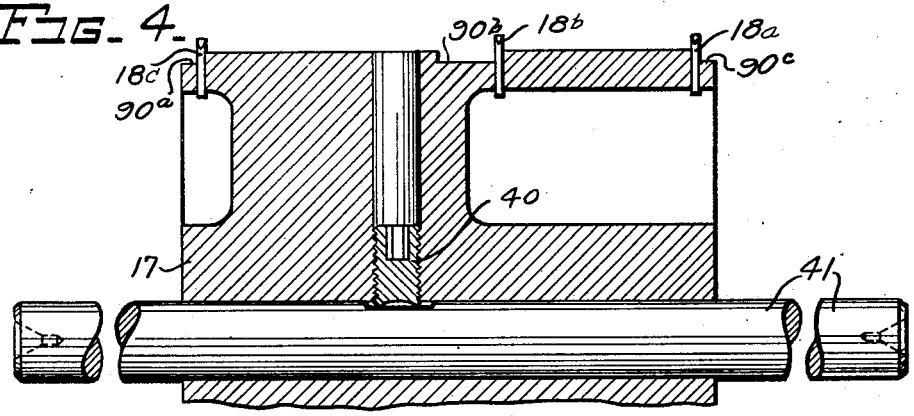
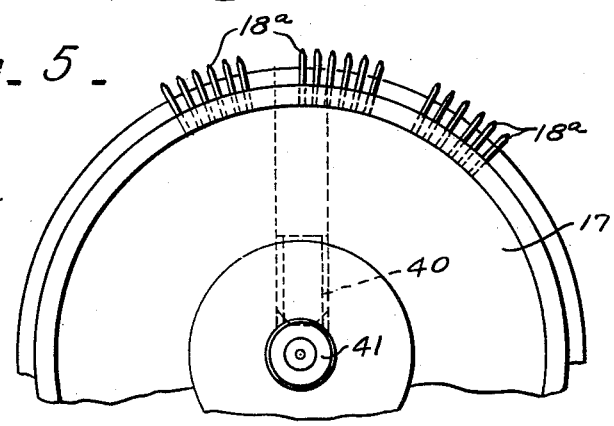
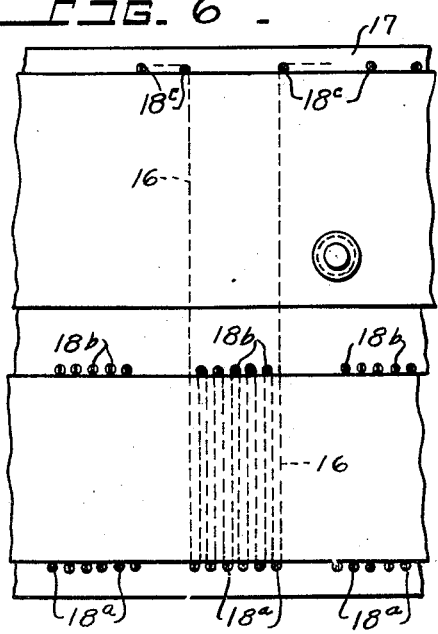
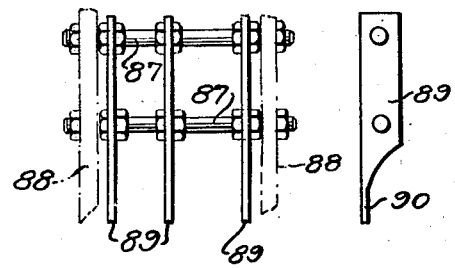
INVENTOR
GEORGE S. NALLE, JR.
BY
ATTORNEYS Patented June 5, 1945

2,377,361

UNITED STATES PATENT OFFICE 2,377,361

STRAIN GAUGE FABRICATING MACHINE

George S. Nalle, Jr., Austin, Tex.

Application December 9, 1943, Serial No. 513,622

7 Claims. (Cl. 140—71)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to strain gauge fabricating machines. Strain gauges, as disclosed in the Simmons Patent No. 2,292,549, dated August 11, 1942, are employed to measure electrically, deformations or strains in bodies to which the strain gauges are bonded by adhesive, and they comprise, in general, fine wire filaments wound back and forth in substantially parallel lengths and cemented to paper sheets, these filaments being subjected to an electric current during a test, the current varying with increase or decrease of strain, since increase of strain increases the resistance. Constantan, copel or other wire of about 0.001 inch diameter is frequently employed for strain gauges. In testing certain engineering materials and specimens subjected to various stresses, strain gauges have proved to be extremely valuable, but they are too expensive and too ununiform, hence unreliable, because heretofore they have been made by hand. It is the principal object of this invention to provide an automatic machine which will make strain gauges having uniform characteristics, so that they may be used without calibration or modification. Thus the machine of the invention will materially lower the cost of strain gauges and will yield a substantially standardized product. Other objects of the invention will be apparent from the following description of the preferred embodiment thereof shown in the accompanying drawings wherein:

Figure 1 is a side elevation of the machine;

Figure 2 is an end elevation of the same;

Figure 3 is a top plan view of the "hold-down" assembly, but on a smaller scale;

Figure 4 is a section through the drum, being approximately a quarter section, on an enlarged scale;

Figure 5 is a fragmentary end elevation of the drum, on the scale of Figure 4;

Figure 6 is a fragmentary development of the surface or periphery of the drum;

Figure 7 is a top plan view of the "pick-off" device;

Figure 8 is a side elevation of one of the fingers of the "pick-off" device;

Figure 9 is a sectional elevation of the pivot bolt of the winder arm assembly;

Figure 10 is a fragmentary plan view of a series of strain gauges made by the machine, shown on an enlarged scale; and Figure 11 is a section on line 11—11 of Fig. 2 showing a detail of the construction.

Referring particularly to the drawings, and first to Figures 1 and 2, the preferred machine has a base B to which various frame members, to be identified, are secured, and is operated by power derived from a constant speed electric motor (not shown) driving a reduction gear train in a gear box 12, the reduction gearing driving a crank disk 13, to which a pitman 14 is pivoted. The pitman is pivotally connected at the other end to a winder arm assembly 15 (to be presently described) which carries the strain gauge filament 16 back and forth across the face of cylindrical drum 17 having pins 18 radiating from its surface. By mechanism to be described, the drum is rotated step-by-step in synchronism with the winder arm assembly, each swing of the latter effecting a sufficient movement of the drum to bring another pin or set of pins into operative position, so that the filament is wrapped partially around the pins to form a series of connected loops which make up the strain gauges, as shown in Fig. 10.

The winder arm assembly comprises a pair of flat bars 20a, 20b, which are secured to each other to lie in parallel planes, by means of a bolt 21 at the lower end, having a spacing sleeve 22, and a pair of parallel bolts 23 at the upper end, each having a spacing sleeve 24 between bars 20a, 20b. At an intermediate point, another bolt 25 with a pair of spacing sleeves 26 provides a pivotal connection for the pitman 14 and, in addition, makes the assembly more rigid. The lower bolt 21 has recesses 27, 28 at opposite ends (Fig. 9), said recesses being substantially conical and centered with each other to receive pivot members on which the winder arm assembly may rock. One pivot member is a stud 31 threaded horizontally through an upright frame member 32 secured to base 11, and having one end ground to a point, as shown at 33, this pointed end being received within recess 27. A lock nut 34 secures stud 31 in its adjusted position. A similar stud 35 is aligned with stud 31 and screwed through upright frame member 32a with its pointed end (not shown) received within recess 28 in the head of bolt 21. By means of the described construction, the winder arm assembly is supported to swing in a vertical plane and, if desired, the entire assembly may be shifted toward or away from the drum by adjusting the stud 31, 35 on which the assembly is pivotally mounted. Thus the plane of operation, i. e., the vertical plane in which the filament is moved by the winder arm assembly, may be varied to effect perfect cooperation with other parts of the machine, which will be better understood as the description proceeds.

The filament is carried on a reel or other source of supply (not shown) and is led downwardly past a tensioning device (not shown) to a pair of deeply grooved pulleys 36, there being one such pulley rotatable on the end of each bolt 23 at the upper end of the winder arm assembly. As shown in Fig. 2, the bolts 23 project far enough out of the plane of swing of the winder arm to bring the filament over the drum, while obviating interference between the drum and the winder arm. The two pulleys are substantially in contact, as shown in Figure 1, and lie in the same vertical plane. Since bolts 23 are parallel and horizontal, oscillation of the winder arm assembly causes oscillation of the two pulleys through a vertical arc and, as shown in Figure 2, the plane of this arc bisects the drum 17. The filament passes from the two pulleys to one end or the other of the drum, where it is wrapped around one of the pins 18, thence to another pin 18 on the opposite side, and so on. The winder arm further carries a lug 37, which may be a rivet about $\frac{3}{32}$ in. diameter, projecting about ⅛ in. beyond a plate 38 to which it is secured, plate 38 being supported by studs 39 screwed into the tapped ends of bolts 23. The function of lug 37 will be explained later on.

The drum assembly, shown in Figs. 4, 5, and 6 on an enlarged scale, comprises the cylindrical drum body 17, which may have a radius of 1.37 in. and a working face 2.5 in. wide, secured by a setscrew 40 to a shaft 41 which may also be press-fitted to the drum. Shaft 41 supports the drum on bearings, not shown, to rotate about a horizontal axis. The pins 18 may each have a drive fit in the drum and are made preferably of music wire of .025 in. diameter, being beveled at their outer ends to facilitate guiding the wire, and extending radially outwardly from the drum surface about .13 in. Near one end of the drum the pins are arranged in a circumferential but discontinuous row, the pins 18a of this row preferably being in groups of six, each pin having its axis spaced 2° from the axis of the adjacent pin of the group, and each group being 8° from the nearest pin (axis) of the group on either side, in the same circumferential row. A second circumferential, discontinuous row of pins 18b is arranged preferably 1.0 in. from the described end row, and the pins thereof project outwardly the same as pins 18a, but are arranged in groups of five, each pin in each group being 2° from the adjacent pin and each group being 10° from the axis of the nearest pin of any adjacent group in the same row. A third circumferential row of pins 18c comprises groups of two pins set 6° apart from each other, each group being 12° from the adjacent group on either side in the same row. One of the pins 18c is spaced 1° from the nearest pin of the group of six pins 18a at the opposite end of the drum, and the pin at the other end of the same group of six is 1° from the other pin 18c of the same group of two. All these angular spacings are measured from pin axis to pin axis.

To cause intermittent rotation of the drum in small increments, a mechanism controlled by oscillation of the power-actuated winder arm assembly is employed. Secured to the drum shaft 41 is a worm wheel 45 which is driven by a worm 46 fast to a horizontal shaft 47 supported in bearings on frame members 48, 49. A knurled nut 50 on one end of shaft 47 facilitates the insertion of a new roll of paper, and aids in servicing the machine. At the other end, shaft 47 carries a ratchet wheel 51, with a sleeve 52 (Fig. 2) secured to the shaft between frame member 49 and the ratchet wheel. As shown in Figure 1, the ratchet wheel 51 has arcuate slots 53, and screws 54 pass through said slots into sleeve 52 to secure the ratchet wheel in adjusted angular relation to the shaft. The preferred ratchet wheel has six teeth, so that each time one of its teeth is engaged, shaft 47 will be rotated one-sixth of a revolution. If the worm wheel has sixty teeth, as is preferred, one-sixth of a revolution of shaft 47, which directly drives the worm, will effect $\frac{1}{360}$ of a revolution of the worm wheel and the drum, or an angular movement of one degree, which is the smallest circumferential distance between any two pins on the drum. Ratchet wheel 51 is operated by intermittent engagement with a pawl 55 pivoted on a pin 56. A carrier member 59 is secured to the inner plate 20a of the winder arm assembly, on the side toward the drum, by a bolt 63. A coil spring 60 is interposed between the top of pawl 55 and the under side of a flange 61 formed on the carrier member, and tends to hold the pawl down against a stop 62 also integral with the carrier member. Each time said assembly swings to the left, as viewed in Fig. 1, the end of the pawl will ride over the ratchet wheel, but as the swing to the right commences, coil spring 60 will cause the toothed end of the pawl to engage the end of the uppermost tooth of the ratchet wheel to effect the one-sixth of a revolution of shaft 47 or 1° of drum movement previously described. This will obviously recur once during each cycle of the winder arm assembly. Adjustment of the position of the pawl on the arm 20a to insure proper engagement with the ratchet and to compensate for wear, may be effected by changing the angle of a link 64, the upper end of which is carried on and clamped by bolt 63 while its lower end receives pin 56 on which the pawl is pivoted.

To impart another 1° movement to the drum through ratchet 51, another pawl 65 is pivoted as at 66 on the enlarged lower end of bar 20a, and a tension coil spring 67 is attached at one end to the upper end of pawl 65, while its other end is attached to bar 20a. A stop 68 prevents spring 67 from swinging pawl 65 beyond a certain point. Stop 68 may be a flange formed integrally with a block 69 to which pivot 66 is attached, and the block may serve as a carrier for pawl 65, with an adjustment provided by a slot 70 in plate 20a, and a screw 71 passing through the slot and entering the block. The direction of slot 70 is such that the block, when adjusted, holds pawl 65 in proper position for engagement with one of the teeth of the ratchet 51 as the winder arm assembly moves to the left (as viewed in Fig. 1) from the extreme right-hand position. It is the lower end of pawl 65 that engages the ratchet as the winder arm swings in the direction stated. In the reverse movement, pawl 65 merely rides over the edge of the ratchet. To hold the ratchet against retrograde movement, a detent 72 is pivoted by a pin 73 (Fig. 11) to the machine frame member 49 and is pressed by compression spring 74 in the direction of the ratchet. A finger 75 extends laterally from the upper end of the detent and always engages one of the teeth of the ratchet.

Referring to Figure 2, a roll 80 of paper, which is to form the base strip of the series of strain gauges produced by the machine, is rotatably mounted near the drum so that the paper 81 passes over the surface of a roller 82 whose bottom dips in a bath of cement (not shown) contained in a tank 83. The cement-coated paper strip 81 then passes to the drum where it passes down between and touches with its opposite edges the two circumferential rows of pins 18a, 18b. The filament or wire is wound on the pins, as will be described in greater detail later, and is immediately brought into contact with the cement on the upper surface of the paper. The cement used may be a resin, and may dry naturally, with the aid of ultra high frequency heating, or with the aid of a blast of air (not illustrated). A strip of cover paper 84 may be supported on a roll 85 and may pass over an electrically heated drying roll 86 located adjacent the drum. The two paper strips are thus united to form a two-ply sheet having a continuous series of connected strain gauges embedded therein. Removal of the two-ply sheet is accomplished by the take-off or pick-off assembly shown in Figures 7 and 8, comprising two or more horizontal rods 87 which are secured rigidly to uprights 88 forming parts of the machine frame, which support stationary fingers 89 whose upper ends 90 are reduced as shown in Figure 8 to closely approach the upper surface of the drum or else fit snugly against it. Preferably the finger ends 90 are received in grooves 90a, 90b, 90c (Fig. 4) formed circumferentially on the drum. The paper sheet slides over the top edges of the fingers as it leaves the drum and is immediately brought in contact with drying roll 86, which completes the cementing of the plies of paper. The two-ply sheet may be cut by shears (not shown) or otherwise, to separate the strain gauges from each other, whereupon the gauges are ready for use.

A hold-down assembly (Figs. 1 and 3) for holding the filament in place, is mounted on the machine above the drum and slightly back of the plane in which the filament is moved by the winder arm assembly. The hold-down assembly comprises an elongated, arcuate bar 91 which lies in a vertical plane and is held against the vertical edges of uprights 88 by a pair of tension coil springs 92 (only one being shown, in Fig. 2) whose opposite ends are anchored by screws 93 to the uprights 88. Actual support of the bar is obtained by fixed pins 94, each projecting horizontally from the aforesaid vertical edges of uprights 88 (Fig. 1), said pins having sliding fits in angular guiding slots 95 cut in bar 91. These guiding slots each consist of a short slot portion joining a longer slot portion of the same width, the two slot portions being at an obtuse angle to each other, with the short slot portion on each side being directed inwardly or toward the center of the machine. As the bar is held yieldingly by the springs, it is free to move, and when moved longitudinally, it will obviously be guided by the pins 94 in the angular slots 95, which will effect an alternate elevation and lowering of the bar as it is moved from the central position of Figure 1 to either limit of movement and back again to said central position. In other words, Figure 1 shows the bar in its lowest position, midway between the extremes of longitudinal movement. If the bar is pushed to the left, as viewed in said figure, it will rise above the drum due to the inclination of the slot portions extending to the right of pins 94. On the other hand, if the bar is thrust to the right, it will again rise an equal amount.

From the foregoing description, in connection with the drawings, it will be clear that the filament is guided by the pulleys on the winder arm assembly to a point above and midway between the ends of the drum and in the medial vertical plane which bisects the drum, and that from this central starting point, as it may be considered, the filament is moved to the right or left beyond the end of the drum. When the filament is so moved, it contacts one of two perches 96, 97 secured to bar 91 and having an arm extending at right angles to the vertical face of bar 91. The perches prevent the filament from getting caught in the gear and being swung any farther toward either end of bar 91 by the winder arm, and thus obviate pulling the filament off the paper strip, since the stress on the filament is largely transferred to the perch with which it is in contact. A strand of .010 in. music wire 98 (Fig. 3) is stretched under considerable tension between and bent over two setscrews 99 fast to bar 91 and is locked at each end by machine screws 100 (Fig. 1) secured in snubbers 101 riveted to and depending from bar 91. This wire strand stretches directly over the top of the drum with the paper on it, but is very slightly back of the plane of the filament, as will be clear from Fig. 2, so that the filament may be swung by the winder arm as described above. Obviously the tensioned wire strand 98 will hold the filament down on the paper on the drum when the hold-down assembly is in the lowest position, Fig. 1. The wire strand 98 is lifted when the hold-down assembly is elevated as described above, to clear the tops of the pins, and then is clamped down on the next course of the filament immediately after it has been laid on the drum.

Secured to the upper end of the winder arm assembly between the two pulleys and projecting toward the hold-down assembly is the previously mentioned lug 37 whose function is to shift the hold-down bar 91. When the winder arm reaches the limit of its movement to the left or right, its lug 37 engages either of two adjustable stops 103, 104, each secured by a screw 105 to bar 91 near its end and being adjustable longitudinally of the bar in slots 106, 107 respectively. Thus the winder arm provides the power to shift the hold-down assembly upwardly and to the right or left as compelled by the shape and location of slots 95. Obviously any such shifting elevates the wire strand above the paper on the drum or, in other words, the winder arm effects lifting of said wire strand off the drum at either limit of movement. As the hold-down bar is lifted by contact of lug 37 with stops 103, 104, two intermediately located stops 108, 109 (adjustable, like stops 103, 104 in separate slots 110) are moved upwardly to be contacted by the lug on its return swing. Stops 108, 109 are, of course, below the path of lug 37 when it moves to the left or right from the intermediate position, Figure 1. The contact of lug 37 with either intermediate stop 108 or 109 restores the hold-down bar to its central, lowermost position. Thus the sequence of operation of the hold-down assembly and the winder arm is as follows: Starting from the position of Figure 1, the winder arm moves to the left until lug 37 engages stop 103, which lifts the hold-down assembly and moves it slightly (about ¼ inch) to the left. Then the winder arm starts back, but before it has swung very far lug 37 engages stop 108 to cause the hold-down bar to shift to the right and simultaneously move downwardly. The lug can now clear stop 108 and the winder arm swings all the way to the right limit of movement, whereupon the lug engages stop 104 to lift the hold-down bar and move it simultaneously to the left. This brings stop 109 into the path of lug 37 on the return, or leftward, swing of the winder arm, and lug 37 thus lowers and centers the hold-down bar before it clears stop 109. Every cycle or back and forth swing of the winder arm repeats the action just described.

Again considering the machine in the position of Figure 1, when the winder arm brings the filament against the perch on the left side, the filament is bent without kinking over the perch, the lower extremity of the filament being, of course, secured to the paper strip. When the winder arm starts to swing back from its extreme left position, the drum is advanced through 1° because of the action of pawl 55 on the ratchet. This brings the filament up against the side of the next pin which is in the middle or right row of pins. Previously the hold-down device has clamped the filament. When the winder arm reaches the right-hand position, the hold-down device is raised, only to be lowered again as the winder arm starts back. Then the drum is rotated through 1° as pawl 65 operates the ratchet, and the winder arm reaches the middle position, which is the position considered as the start. The winding of the strain gauge on the pins thus depends on the step-by-step rotation of the drum synchronized with the back-and-forth weaving action of the winder assembly, and the hold-down action previously described.

While the base strip of paper may be perforated (not shown) along three lines so that its perforations will register with the three circumferential rows of pins on the drum, it is within the scope of my invention to employ a paper strip which will be easily pierced by the outer ends of the pins (which will be pointed) as the paper strip is brought up against the drum under tension. Furthermore, it is not necessary to employ two paper strips when forming the strain gauges, as the filament may be cemented to a single strip of paper if desired. Instead of a drum, a properly supported endless belt (not shown) carrying pins arranged in any preferred manner may be used. Other modifications within the scope of the appended claims are contemplated.

What I claim is:

1. A strain gauge fabricating machine comprising, in combination, a machine frame; a paper strip supporting member; pins fixed to and projecting from said member; means for feeding a strip of paper over the top of said member; means for applying an adhesive to the outer surface of the strip of paper before it reaches said member; a swingably mounted winder arm; filament-guiding means on the free upper end of the winder arm, said guiding means bringing the filament over the top of said member and the coated paper thereon, and in contact with said pins; and mechanism interposed between the winder arm and said member to cause synchronized step-by-step movement of said member with swinging of the winder arm; one step of said movement bringing a pin in such a position that its side is engaged by the filament as the filament is brought over by the winder arm; the next succeeding step brings another pin in such position that its side is engaged by the filament as the filament is brought over by opposite swing of the winder arm; each step of said movement causing a pin to advance to pull the filament around the sides of the pin, and each swing of the winder arm causing the filament to extend from a pin on one portion of said member to another pin well spaced from the pin first mentioned.

2. The invention according to claim 1, wherein there is a hold-down device which alternately descends to clamp the filament on the paper strip where supported on said supporting member, and rises to release the filament, and means to operate said hold-down device in synchronism with the winder arm, so that each time the winder arm starts to move in one direction, the hold-down device clamps the filament, and as the winder arm reaches its limit of movement, the hold-down device is moved to release the filament.

3. The invention according to claim 1, wherein there is a hold-down device comprising an arcuate bar supported on the machine frame; means on the winder arm engaging the bar so that the bar is moved in opposite directions as the winder arm swings in opposite directions; means on the machine frame to guide the bar so that it is lifted above and lowered close to the paper on the drum; and a wire stretched across the lower part of the bar and adapted directly to engage the filament on the paper when the bar is lowered.

4. A machine for fabricating strain gauges comprising, in combination, a member which is movable step-by-step; means carried by the movable member about which a fine filament may be wound; means to deliver a strip of paper over said movable member; filament-winding means; hold-down means engaging the filament on said movable member; power means to actuate the filament-winding means; mechanism interconnecting the filament-winding means with the member so that the member is synchronized with the filament-winding means and moves only in response to the movements of the latter; and means interconnecting the filament-winding means with the hold-down means so that the hold-down means alternately clamps the filament upon the member and releases it.

5. The invention according to claim 4, wherein means are provided to cause the hold-down means to clamp the filament on the paper strip each time the winder arm starts to swing in either direction and to release the filament as the end of the swing is reached; the hold-down means comprising a bar supported on the machine frame above the movable member and having a tensioned wire strand for directly engaging the filament to hold the same on the paper strip; the wire strand having its ends secured to the bar and being spaced from all parts of the bar between said secured ends and being slightly spaced from the plane of movement of the filament, so that the filament may be guided and laid on the strip of paper without interference from the wire strand.

6. The invention according to claim 4, wherein means are provided to cause the hold-down means to clamp the filament on the paper strip each time the winder arm starts to swing in either direction and to release the filament as the end of the swing is reached; the hold-down means comprising a bar supported on the machine frame above the supporting member and having a tensioned wire strand for directly engaging the filament; and a pair of perches secured to the bar and extending outwardly therefrom and spaced from the ends of the bar, said perches being contacted by the filament, as the filament is moved by the winder arm, to prevent pulling the filament off the paper strip.

7. The invention according to claim 4, wherein the hold-down means consists of a bar supported by pins on the machine frame and having angle slots receiving said pins so that the bar may move in the direction of swing of the winder arm, and may be lifted and lowered during such movements; means carried by the bar to directly engage the filament when the bar is lowered; the winder arm having a lug projecting therefrom; the bar having a stop toward either end and another stop adjacent either end; means to adjust the positions of the stops relative to the bar; the lug passing by one stop and striking the stop adjacent the end of the bar, each time the winder arm moves in either direction, and said striking of the stop causing the bar to rise to put the stop which was passed by directly in the path of the lug on the reverse swing of the winder arm, the lug then striking the stop last mentioned to cause the bar to descend to effect clamping of the filament.

GEORGE S. NALLE, JR.